Jan. 7, 1969            M. MORSE            3,420,119
NONEXPANDABLE BOOT
Original Filed Feb. 8, 1965
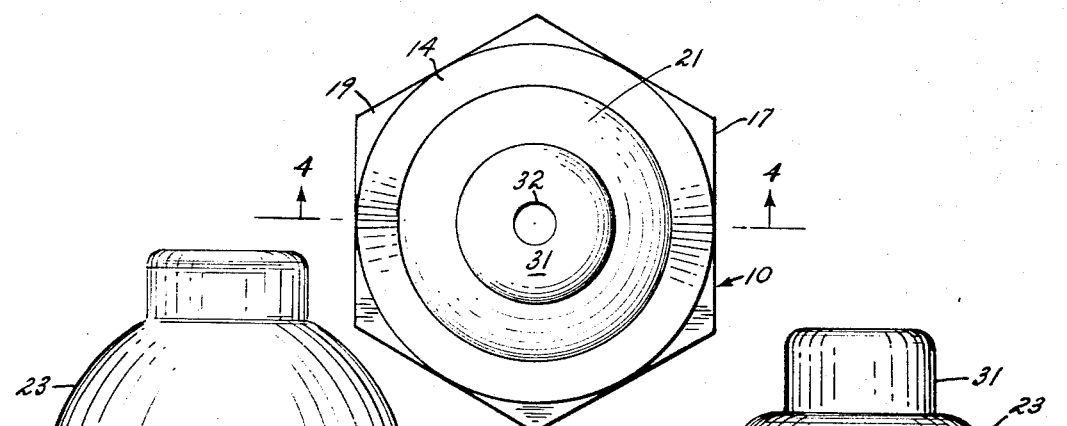
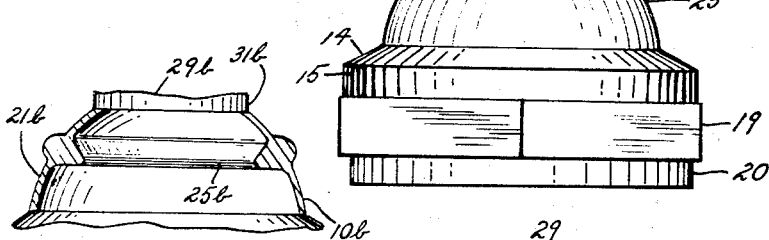
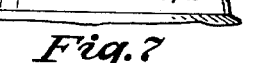
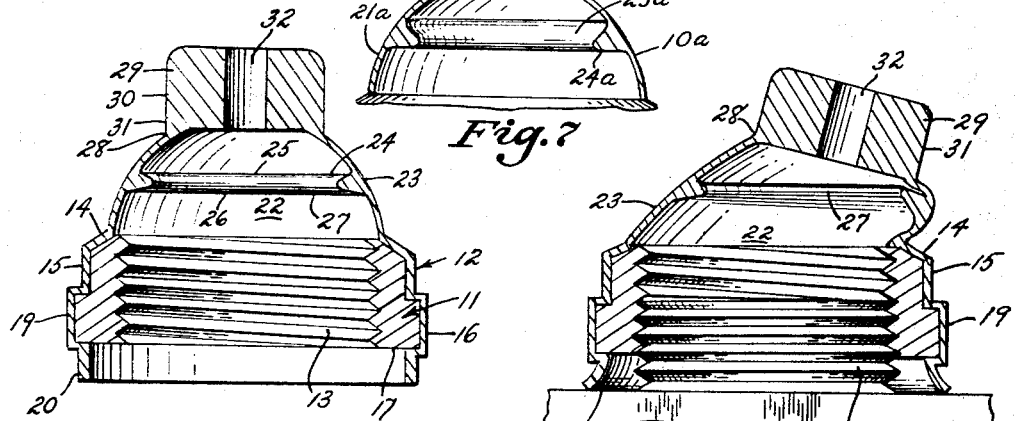

United States Patent Office 3,420,119
Patented Jan. 7, 1969

3,420,119
NONEXPANDABLE BOOT
Milton Morse, 1 Horizon Road, Fort Lee, N.J. 07024
Continuation of application Ser. No. 431,037, Feb. 8, 1965. This application June 19, 1967, Ser. No. 652,389
U.S. Cl. 74—566   3 Claims
Int. Cl. G05g 1/00

A composite switch boot including a nut element and boot element surrounding and bonded to the nut element, the boot element including a thin-walled flexible portion of generally arcuate configuration tapering in a direction away from the nut element, the flexible portion having inner and outer surfaces, and an annular reinforcing rib secured to said inner surface.

---

This application is a continuation of my copending application Ser. No. 431,037; filed Feb. 8, 1965, under the same title, now abandoned.

This invention relates generally to the field of hermetically sealing boots used to enclose openings in a panel through which moving elements such as toggle switches partially project. Devices of this general type are known in the art, and the invention lies in specific constructional details which permit improved utility.

Electronic equipment upon which devices of the instant type are installed are often subjected to pressure differentials existing between the inner and outer surfaces of an enclosure. For example, when a piece of equipment is hermetically sealed at normal atmospheric pressure, and the instrument is then placed in an atmosphere of considerably reduced pressure, the air confined within the equipment tends to flow through openings in the housing in order to equalize the pressure differential. Where the housing includes one or more openings which are sealed by devices of a rubber-like nature, portions of which are thinner than other portions to facilitate necessary flexing, the thinner portions tend to distend under such pressure, even to the point of rupture. However, the thinness of section at the weakest points must be substantially maintained in order to permit adequate flexibility and easy manipulation of a switch toggle or other projecting movable element.

It is therefore among the principal objects of the present invention to provide an improved flexible sealing boot of the class described, in which the above mentioned disadvantage has been substantially eliminated.

Another object of the invention lies in the provision of an improved hermetic sealing boot in which the cost of fabrication may be directly comparable to existing prior art devices, thereby permitting consequent wide sale, distribution and use.

Yet another object of the invention lies in the provision of an improved hermetic sealing boot in which the flexibility thereof has not been impaired while providing adequate provision against excessive expansion under large pressure differential.

A feature of the invention lies in the fact that the devices may be manufactured using conventional methods of manufacture, and materials already known and existing in the prior art.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIGURE 1 is a plane view of an embodiment of the invention.

FIGURE 2 is a side elevational view thereof.

FIGURE 3 is another side elevational view thereof showing the appearance of the embodiment in installed condition and under substantial pressure differential.

FIGURE 4 is a central sectional view as seen from the plane 4—4 in FIGURE 1.

FIGURE 5 is a sectional view similar to that seen in FIGURE 4, but showing the device in installed condition against the plate of a housing, and with certain of the members thereof in altered relative position.

FIGURE 6 is a side elevational view of a conventional device showing the excessive distension obtained when subjected to substantial differential pressure.

FIGURE 7 is a fragmentary sectional view corresponding to that seen in FIGURE 4, but showing a modified form of the embodiment.

FIGURE 8 is a fragmentary sectional view corresponding to that seen in FIGURE 4, but showing a second modified form of the embodiment.

In accordance with the invention, the device, generally indicated by reference character 10 comprises broadly: a nut element 11 and a boot element 12.

The nut element 11 is preferably formed from metallic material, and includes an inner threaded bore 13 which permits the mounting of the same upon the bushing (not shown) of a conventional toggle switch. It is bounded by first and second side surfaces 14 and 15, as well as a polygonal surface 16 and a lower surface 17.

The boot element 12 is bonded to the nut element 11 and is preferably formed from silicone rubber or other material having similar properties, and includes a nut element engaging portion 19, a sealing lip member 20, and a thin-walled flexible portion 21. The portion 21 includes inner and outer generally spherical surfaces 22 and 23, respectively. Preferably integrally molded with the inner surface 22 is a rib 24 bounded by an upper surface 25, a lower surface 26 and a curved edge surface 27. From a consideration of FIGURE 4, it will be observed that the rib 24 lies in a plane substantially perpendicular to the principal axis of the device to facilitate molding.

Connecting with an upper peripheral edge 28 of the flexible portion 21 is a cylindrical sleeve member 29 including an outer surface 30, a cylindrical surface 31 and a centrally disposed cylindrical bore 32 through which the toggle of a switch (not shown) may project.

Referring to FIGURE 5, when the device is installed, the sleeve member 29 may be flexed to angular disposition with respect to the principal axis of the device, accommodation being provided by flexing of the thin-walled portion 21 above or below the rib 24.

By comparing FIGURES 3 and 6, it will be observed that when pressure within the housing upon which the device is installed attempts to expand the thin-walled flexible portion 21, expansion is limited to a very small degree by the presence of the rib 24. By contrast, in the case of prior art devices where no rib is present, the thin-walled portion expands in an unlimited fashion, depending upon the degree of pressure differential present.

In the alternate form illustrated in FIGURE 7, parts corresponding to those of the principal form have been designated by similar reference characters with the additional suffix "a." The alternate form differs from the principal form only in that the rib 24a is disposed in a conical plane, the apex of which lies at the center of curvature of the spherical thin-walled flexible portion 21a. Since expansion occurs in a radial direction, in this variation better control of expansion is achieved than is the case in the principal form, although molding of the article is not as convenient.

Referring to FIGURE 5 in the drawing, there is illustrated the configuration assumed by the device 10 when the same is mounted upon a toggle switch (not shown), and the toggle is moved to an off center position. In the instant device, as with conventional devices as shown in FIGURE 6, the moving of a toggle lever to an off center position involves distortion of the sealing device, with an accompanying reactive force tending to move the toggle lever back to center position. It is for this reason that the portion 23 is thin-sectioned, wherein the reactive force is maintained at a minimum. It can be demonstrated that where the device is inflated as shown in FIGURE 6, because of the symmetrical configuration of the device, the reactive force tending to return the toggle lever to a central position is materially increased. Where sufficient inflation is obtained, the force developed can be sufficient to actually move the lever from the desired position with unforeseen results.

As seen in FIGURE 5, the movement of a toggle lever to an off center position involves some distortion of the rib 27, but most of the distortion is confined to the walled portions above and below the rib. Thus, in uninflated condition, the reactive force is comparable to that developed in the device shown in FIGURE 6. However, under extreme pressure differential, the reactive force in the case of the instant device 10 is varied very little from that existing when the pressure differential is not present, that is to say the reactive force is maintained within reasonable limits which will not be of sufficient magnitude to come anywhere near that required to move the toggle lever. Since the device cannot expand as shown in FIGURE 6, a potential source of danger is completely eliminated.

Turning now to the second alternate form of the embodiment shown in FIGURE 8, parts corresponding to those seen in FIGURE 7 have been designated by similar reference characters with the additional suffix "b."

In the form shown in FIGURE 8, the rib 25d is formed on both the inner and outer surfaces of the device to provide additional cross sectional area of material limiting inflation, and may be employed in those locations where extreme pressure differentials are to be expected.

I wish it to be understood that I do not consider the invention limited to the precise details of structure shown and set forth in this specification, for obvious modifications will occur to those skilled in the art to which the invention pertains.

I claim:

1. In a composite switch boot including a nut element and a boot element surrounding and bonded to said nut element, said boot including a thin-walled flexible portion of generally arcuate configuration tapering in a direction away from said nut element, and terminating at a free end thereof in a cylindrical sleeve portion having a centrally disposed opening axially aligned with respect to the axis of said nut portion, and interconnected at an opposite end thereof to a relatively thicker portion of said boot element, the improvement comprising; said flexible portion having inner and outer surfaces, and an annular reinforcing rib secured to said inner surface, substantially at the medium part thereof between said sleeve and said thicker portion to limit radially outwardly directed expansion of said thin-walled portion upon the occurrence of a pneumatic pressure differential existing between said inner and outer surfaces.

2. Structure in accordance with claim 1, said rib being integrally molded to said thin-walled portion.

3. Structure in accordance with claim 2, said thin-walled portion being spherically-shaped, said rib being thickest in a conical surface of revolution radially disposed with respect to the center of said spherical thin-walled flexible portion.

References Cited

UNITED STATES PATENTS

| | | | |
|---|---|---|---|
| 1,800,578 | 4/1931 | Webb | 74—18 XR |
| 1,952,876 | 3/1934 | Lucey | 74—18.1 XR |
| 2,062,748 | 12/1936 | Golden | 74—566 |
| 2,421,841 | 6/1947 | Lowy | 74—18 XR |
| 2,795,144 | 6/1957 | Morse | 74—17.8 |
| 3,248,955 | 5/1966 | Templeton | 74—18.1 |

FRED C. MATTERN, JR., *Primary Examiner.*

JAMES A. WONG, *Assistant Examiner.*

U.S. Cl. X.R.

74—18, 558.5